V. DOYLE.
PACKING TOOL.
APPLICATION FILED JULY 25, 1919.
1,341,888.
Patented June 1, 1920.
Fig. 1.
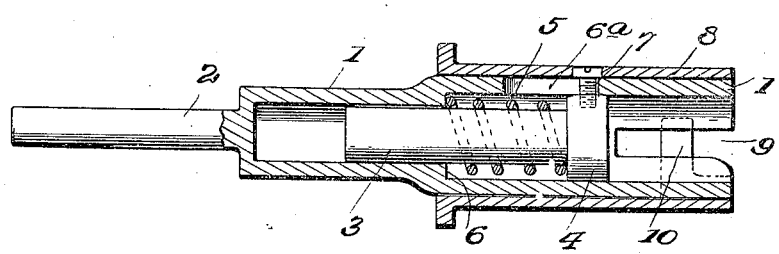
Fig. 2.
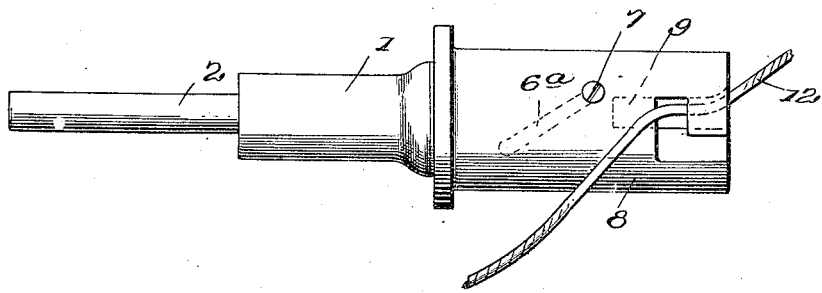
Fig. 3.
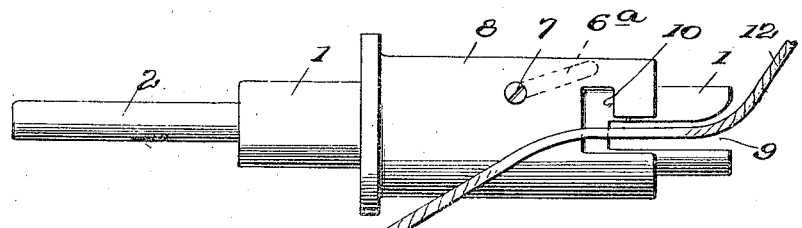
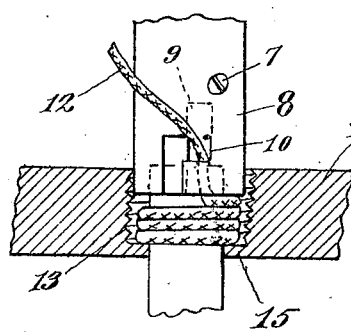
Fig. 4.
Inventor.
Vernon Doyle
by Fred P. Gorin
his Atty.

UNITED STATES PATENT OFFICE.

VERNON DOYLE, OF SEATTLE, WASHINGTON.

PACKING-TOOL.

1,341,888. Specification of Letters Patent. Patented June 1, 1920.

Application filed July 25, 1919. Serial No. 313,417.

*To all whom it may concern:*

Be it known that I, VERNON DOYLE, a citizen of the United States, residing at Seattle, in the county of King and State of Washington, have invented certain new and useful Improvements in Packing-Tools, of which the following is a specification.

This invention relates to improvements in packing devices.

The object of the invention is to provide a packing device, which will quickly and uniformly pack filamentary packing.

The invention also comprehends improvements in the details of construction and arrangement of parts which will be hereinafter described and particularly pointed out in the claims.

In the drawings Figure 1 is a central longitudinal view, illustrating the improvements. Fig. 2 is a side elevation of the packing device in operative position, showing a fragment of the packing in place. Fig. 3 is a similar view showing the parts of the device in a moved position ready to receive the packing. Fig. 4 is a sectional view of a plate showing the end of a condenser tube with the packing tool in operative position.

Referring particularly to the drawings, reference numeral 1 indicates the main body portion of the device, at one end of which is a shank 2. Within the main body portion 1 is a longitudinal aperture shouldered as shown at 6 in Fig. 1. The body portion 1 is provided with an oblique slot $6^a$ for a purpose to be described. 3 indicates a plunger provided at one end with a head 4, a spring 5 being mounted on the stem of said plunger 3, one end of which bears against the head 4, and the other end against the shoulder 6. In the periphery of the head 4, is a threaded aperture, in which fits a set-screw 7. Upon the main body portion 1 is a slidably mounted sleeve 8, held in relative position with body portion by the set-screw 7, the head of the screw being flush with the periphery of the sleeve, so that when the device is rotated to apply the packing indicated at 12, the packing will not be engaged by obstructions.

In the lower end of the main body portion 1, is a slot 9, with one edge wall curved as shown. In the lower end of the sleeve 8 is an angular slot 10, which coöperates with the slot 9, when the device is in use. When the sleeve 8 is moved against the tension of the spring 5, the head of the set screw 7 follows the oblique slot $6^a$, in the body portion and the latter is caused to turn axially consequently the open ends of the angular slot 10 and the horizontal slot 9, will register with each other, as shown in Fig. 3. And the packing 12 may be laid within the alined slots. Now, if the sleeve be released, the spring will return it to normal, shown in Fig. 2, and the wall of the angular portion of the slot 10 will act as a guide for the packing material and insure uniform and substantial packing, inasmuch as all of the packing material passes through the slot, bringing the end of the packing material down into the threaded aperture 13.

When using a power-driven packing tool of ordinary construction, centrifugal force causes the end of the packing to whip in all directions, which makes it necessary to use a hand-packing tool to place the last two or three inches of the packing into place; but with my device, it will be seen that this difficulty is overcome. This not only saves a great deal of time, but it also prevents the packing from raveling, and sometimes cutting, or otherwise being disfigured upon the threads within the chamber to be packed, such for instance as a threaded aperture shown at 13.

15 indicates a shoulder at the bottom of the threaded aperture 13, upon which the packing is started to be wound. It will be seen that as the packing material is rapidly coiled within the threaded aperture, the sharp threads therein will undoubtedly mar the packing unless inserted with great care; but with my device all danger of marring the packing is entirely overcome.

What I claim is:

1. A packing device comprising an inner sleeve and stem formed with an open end longitudinal slot, a plunger in the inner sleeve, a spring between the plunger and the inner sleeve, and outer sleeve having an open end angular slot to coöperate with and close the open end of the longitudinal slot, and means to create relative circumferential movement between the inner and outer sleeves when the plunger is moved to compress the spring.

2. A packing device comprising an inner sleeve and stem formed with an open end longitudinal slot and a peripheral oblique slot, a plunger in the inner sleeve, a spring interposed between the plunger and the inner sleeve, an outer sleeve having an open end angular slot to coöperate with and close the open end of the longitudinal slot, and a connection between the inner and outer sleeves and passing through the oblique slot, whereby, when the sleeves are moved longitudinally with respect to each other a circumferential movement between said sleeves is created.

3. A packing tool including a pair of sleeves, one fitting within the other and adapted for longitudinal and circumferential movement, one sleeve having a slot therein, the other sleeve being provided with an angular slot adapted to coöperate with the slot in the first-mentioned sleeve to open or close one end of the slot in the first mentioned sleeve when the sleeves are moved longitudinally and circumferentially with respect to each other.

In testimony whereof I affix my signature.

VERNON DOYLE.